(12) United States Patent
Suzuki et al.

(10) Patent No.: US 9,264,142 B2
(45) Date of Patent: Feb. 16, 2016

(54) RZ OPTICAL MODULATOR AND RZ OPTICAL MODULATION METHOD

(75) Inventors: Kouichi Suzuki, Tokyo (JP); Masao Morie, Tokyo (JP)

(73) Assignee: NEC CORPORATION, Tokyo (JP)

( * ) Notice: Subject to any disclaimer, the term of this patent is extended or adjusted under 35 U.S.C. 154(b) by 69 days.

(21) Appl. No.: 14/128,568

(22) PCT Filed: Jun. 21, 2012

(86) PCT No.: PCT/JP2012/066460
§ 371 (c)(1),
(2), (4) Date: Dec. 20, 2013

(87) PCT Pub. No.: WO2013/005623
PCT Pub. Date: Jan. 10, 2013

(65) Prior Publication Data
US 2014/0133869 A1    May 15, 2014

(30) Foreign Application Priority Data
Jul. 1, 2011   (JP) ................................ 2011-147562

(51) Int. Cl.
| H04B 10/04 | (2006.01) |
| H04B 10/516 | (2013.01) |
| H04B 10/50 | (2013.01) |
| H04B 10/556 | (2013.01) |

(52) U.S. Cl.
CPC ........ *H04B 10/5162* (2013.01); *H04B 10/5053* (2013.01); *H04B 10/5561* (2013.01)

(58) Field of Classification Search
CPC .... H04B 10/516; H04B 10/5162; H04J 14/06
See application file for complete search history.

(56) References Cited

U.S. PATENT DOCUMENTS

| 7,421,210 B2 | 9/2008 | Miyazaki | |
| 2003/0206740 A1* | 11/2003 | Lee et al. | ......................... 398/79 |
| 2004/0208646 A1 | 10/2004 | Choudhary et al. | |
| 2005/0117915 A1 | 6/2005 | Miyazaki | |
| 2005/0185968 A1* | 8/2005 | Dorrer et al. | .................. 398/188 |
| 2008/0138082 A1 | 6/2008 | Kang et al. | |
| 2010/0215374 A1* | 8/2010 | Liu et al. | ......................... 398/98 |

(Continued)

FOREIGN PATENT DOCUMENTS

| CN | 1409501 (A) | 4/2003 |
| CN | 101478346 (A) | 7/2009 |
| JP | 2000-121855 A | 4/2000 |

(Continued)

OTHER PUBLICATIONS

International Search Report (ISR) (PCT Form PCT/ISA/210), in PCT/JP2012/066460, dated Aug. 7, 2012.

(Continued)

*Primary Examiner* — Dzung Tran
(74) *Attorney, Agent, or Firm* — McGinn IP Law Group, PLLC (57) ABSTRACT

In an optical transmission system using an RZ code, in order to improve the quality of the modulated transmission signal, an RZ optical modulator includes an RZ carver that outputs a optical pulse train of the RZ code, a polarization adjustment device which improves and outputs a polarization extinction ratio of optical pulse train outputted from the RZ carver and an optical modulator which modulates and outputs the optical pulse train outputted from a polarization adjustment device.

18 Claims, 5 Drawing Sheets

(56) References Cited

U.S. PATENT DOCUMENTS

2010/0260504 A1* 10/2010 Takahara .................. 398/152
2012/0294622 A1* 11/2012 Holroyd et al. ............ 398/131

FOREIGN PATENT DOCUMENTS

| | | |
|---|---|---|
| JP | 2003-249897 A | 9/2003 |
| JP | 2004-088250 A | 3/2004 |
| JP | 2005-167474 A | 6/2005 |
| JP | 2010-78775 A | 4/2010 |
| JP | 2011-34057 A | 2/2011 |

OTHER PUBLICATIONS

Chinese Office Action dated Sep. 14, 2015 with an English translation.

* cited by examiner

RZ OPTICAL MODULATOR AND RZ OPTICAL MODULATION METHOD

TECHNICAL FIELD

The present invention relates to an RZ optical modulator and an RZ optical modulation method which perform transmission using an RZ (return to zero) code as a transmission code.

BACKGROUND ART

More capacity enlargement for a core transmission system is required along with the increase of the internet traffic. Under such condition, the coherent optical transmission technology is noted. An optical transmitter used in a coherent optical transmission phase-modulates an optical signal. And an optical receiver used in a coherent optical transmission receives a phase-modulated optical signal, mixes the received optical signal with the local oscillation light, generates a beat signal and reproduces transmission data from the beat signal.

In the coherent optical transmission technology, in particular, DP-QPSK can improve the wavelength utilization efficiency to double by performing the QPSK modulation for the orthogonal polarized optical waves with different signals respectively. For this reason, consideration for realizing a large capacity optical communication system using DP-QPSK is performed. Incidentally, DP-QPSK is an abbreviation of dual polarization-quadrature phase shift keying (polarization multiplexing with four phase shift modulation).

In recent years, it has begun to be studied to apply the coherent optical transmission technology to an inter-continental submarine optical transmission system. The yield strength to the deterioration of OSNR (optical signal to noise ratio) caused by a multiple cascade connection of the transponders is requested for the signal used in a submarine optical transmission system. For this reason, in a submarine optical transmission system, an RZ (return to zero) code in addition to an NRZ (non return to zero) code used widely in a land optical transmission system is also used. And by applying the coherent transmission technology to an RZ code transmission system, it is expected to improve the transmitter OSNR.

In a coherent optical transmission system using an RZ code, the light which a CW (continuous wave) light source outputs is inputted to an RZ modulator and an RZ pulse train is generated. The RZ modulator which generates an RZ pulse train from the CW light is called the RZ carver. The RZ pulse train generated at the RZ carver is inputted to the DP-QPSK modulator. The RZ pulse train inputted to the DP-QPSK modulator is separated into two, and QPSK modulation is performed by the respective different data. QPSK-modulated two RZ pulse trains are multiplexed so that the polarizations of the modulated light become orthogonal each other and transmitted to a transmission line.

In relation to the present invention, PTL (patent document) 1 discloses a phase modulation communication system which branches light signals amplitude-modulated by a clock, and performs the polarization mixing after the phase modulation for the respective light signals by the different data. PTL 2 discloses an optical transmission apparatus with which an optical phase modulator and an optical intensity modulator have been connected in series.

CITATION LIST

Patent Literature

[PTL 1] Japanese Patent Unexamined Application No. 2003-249897

[PTL 2] Japanese Patent Unexamined Application No. 2004-088250

SUMMARY OF INVENTION

Technical Problem

As mentioned above, the RZ carver for generating an RZ pulse train is arranged between the CW light source and the DP-QPSK modulator in a coherent optical transmission system using an RZ code.

In general, a CW light source oscillates in only TE (transverse electric) oscillation mode, and the TE/TM (transverse magnetic) ratio (polarization extinction ratio) is no smaller than 30 dB in a typical CW light source. And in an optical transmission system using an NRZ code, The CW light source and the DP-QPSK modulator are connected by a polarization preserving optical fiber without setting up a connection point on the way. Accordingly, in an optical transmission system using an NRZ code, the light outputted from a CW light source is inputted to a DP-QPSK modulator while keeping the high polarization extinction ratio.

However, when a part like the RZ carver is inserted between the CW light source and the DP-QPSK modulator in order to use an RZ code, a connection point arises to a polarization preserving optical fiber. A polarization axis of an optical fiber needs to be made coincided in addition to the center axis of the core on connecting the polarization preserving optical fiber. However, it is difficult to make these axes coincided and the polarization extinction ratio degrades by incompleteness of the axis adjustment. For example, when a component such as the RZ carver is inserted between the CW light source whose polarization extinction ratio is about 30 dB and the DP-QPSK modulator, the polarization extinction ratio of the RZ pulse train inputted to the DP-QPSK modulator may degrade to about 10 dB.

On the other hand, the DP-QPSK modulator is generally produced as an optical waveguide device. Additionally, DP-QPSK modulator is often designed with supposing that either linearly polarized light of TE or TM is inputted. Therefore, only when the light inputted from the CW light source to the DP-QPSK modulator has the sufficient polarization extinction ratio, the OSNR of the transmission signal outputted from the DP-QPSK modulator is reserved.

However, when the RZ carver is arranged between the CW light source and the DP-QPSK modulator, the polarization extinction ratio of the light inputted to the DP-QPSK modulator degrades to modulate the DP-QPSK with the RZ code. For this reason, when the DP-QPSK modulation method is tried to be applied to an optical transmission system using RZ code, the OSNR of the transmission signal may degrade.

Although disclosing a general phase modulation communication system, PTL 1 does not disclose the technology which settles the problem that the polarized wave extinction ratio of the light signal degrades by using the RZ carver. Although PTL 2 discloses a configuration in which the RZ code is performed with the optical phase modulation, the polarization extinction ratio of the light signal which is also inputted to the optical phase modulator degrades by an optical intensity modulator disclosed in PTL 2. And PTL 2 does not disclose the configuration for settling the problem that the polarization extinction ratio degrades.

That is, when the DP-QPSK modulation method is applied to an optical transmission system using RZ code, neither PTL 1 nor PTL 2, describes a means for settling the problem that the OSNR of the transmission signal may degrade by the polarization extinction ratio degradation.

The object of the present invention is to provide the technology for improving the quality of the modulated transmission signal in an optical transmission system using RZ code.

Solution to Problem

An RZ optical modulator of the present invention includes: an RZ carver for outputting an optical pulse train of an RZ (return to zero) code; a polarization adjustment means for improving a polarization extinction ratio of the optical pulse train outputted from the RZ carver and outputting the optical pulse train whose extinction ratio is improved; and an optical modulation means for modulating and outputting the optical pulse train outputted from the polarization adjustment means.

An RZ modulation method of the present invention includes: outputting an optical pulse train of RZ code; improving a polarization extinction ratio of the optical pulse train; and modulating the optical pulse train whose polarization extinction ratio is improved and outputting the modulated optical pulse train.

Advantageous Effects of Invention

In an optical transmission system using an RZ code, the present invention offers the effect that the quality of the transmission signal is improved.

DESCRIPTION OF EMBODIMENTS

In each of the first to the third exemplary embodiments below the exemplary embodiment in which an RZ optical modulator of the present invention is applied to an optical transmitter.

The First Exemplary Embodiment

Figure 1:
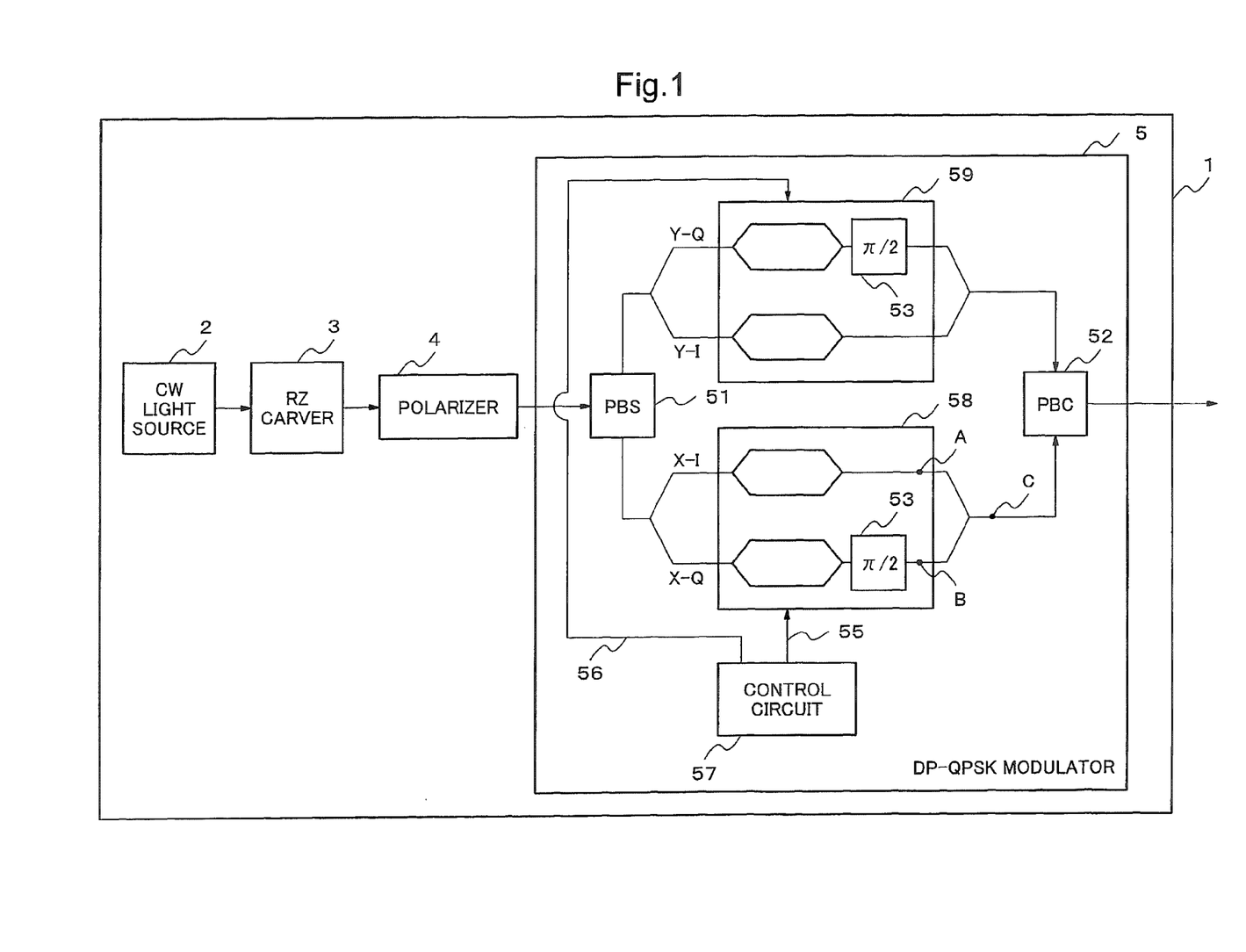
FIG. 1 shows a composition of an optical transmitter of the first exemplary embodiment.

FIG. 1 is a figure which shows a composition of the optical transmitter of the first exemplary embodiment of the present invention. An optical transmitter 1 shown in FIG. 1 includes a CW light source 2, an RZ carver 3, a polarizer 4 and DP-QPSK modulator 5. The polarizer 4 is arranged between the RZ carver 3 and the DP-QPSK modulator 5. And the CW light source 2, the RZ carver 3, the polarizer 4 and DP-QPSK modulator 5 are connected each other with polarization maintaining fibers respectively.

The CW light source 2 oscillates the CW light which becomes a carrier of a transmission signal and outputs the CW light to the RZ carver 3. For example, the polarized wave extinction ratio of the light outputted from the CW light source 2 is about 30 dB. The RZ carver 3 converts the inputted CW light into a pulse train of an RZ code. For example, an RZ pulse train can be generated from the CW light by the amplitude modulation for the CW light with a clock whose rate is equal to the baud rate (the number of modulation times per second) of the phase modulation. Here, by passing through the RZ carver 3, the polarization extinction ratio of the RZ pulse degrades into about 10 dB.

The RZ pulse train generated at the RZ carver 3 passes through the polarizer 4, and is inputted to the DP-QPSK modulator 5. The polarizer 4 outputs the light whose polarization extinction ratio is no more than 10 dB as a linearly polarized light by whose polarization extinction ratio is high. The polarizer 4 is an optical component used for a polarization adjustment which is also called a polarizer. According to the first exemplary embodiment, the RZ pulse train which has passed through the polarizer 4 is inputted to the DP-QPSK modulator 5 with the polarization extinction ratio no smaller than 20 dB. Accordingly, by setting the polarization direction of the output of the polarizer 4 to the direction fitting to the coupling with the DP-QPSK modulator 5, it is enabled to operate the DP-QPSK modulator 5 by the RZ pulse train with the high extinction ratio. For example, when the DP-QPSK modulator 5 is designed by the condition that the electric field of the incident light is in the direction parallel to the substrate, the polarized light of the light outputted from the polarizer 4 and inputted to the DP-QPSK modulator 5 shall be made in the direction parallel to the substrate of the DP-QPSK modulator 5. Further, a part for the polarization adjustments which improves and outputs the polarization extinction ratio of the inputted light may be used instead of the polarizer.

The DP-QPSK modulator 5 is an optical waveguide device configured as two QPSK modulators are connected in parallel. A PBS 51 separates the inputted light in two lights X and Y whose polarizations are orthogonal each other. Hereinafter, the respective lights of the polarized waves separated in the PBS 51 are called "X polarization light" and "Y polarization light".

The X polarization light and the Y polarization light are modulated with the QPSK modulation by data 55 and 56 which are outputted from a control circuit 57 and applied to the electrode parts 58 and 59, respectively.

Incidentally, the intensity difference between the X polarization light and the Y polarization light outputted from the optical transmitter 1 can be made small by setting the polarization direction of the light outputted from the polarizer 4 so that the strength of the X polarization light and the Y polarization light which are outputted from the PBS 51 may become equal. The polarization loss difference (polarization dependent loss) that occurs between the X polarization light and the Y polarization light can be made small by making the intensity difference of the X polarization light and the Y polarization light small, so that the transmission quality difference can be reduced.

The X polarization light and the Y polarization light are modulated with the QPSK modulation as an I (Inphase) signal and a Q (Quadrature) signal respectively. In FIG. 1, the light signal modulated as I signal is indicated by X-I and Y-I, and the light signal modulated as a Q signal is indicated by X-Q and Y-Q.

The X-I signal and the X-Q signal are modulated with the QPSK modulation by data 55. The Y-I signal and the Y-Q signal are modulated with the QPSK modulation by data 56. Further, a bias voltage for driving the electrode part 58 and the electrode part 59 is superposed by the control circuit 57 on data 55 and data 56.

The X polarization light and the Y polarization light to which the QPSK modulation has been performed are transmitted as the DP-QPSK modulation signals after performed the polarization-combination in the PBC (Polarization Beam Combiner) 52.

FIGS. 2 to 5 are the figures which show a constellation of the modulation signal in each part in the DP-QPSK modulator 5.

Figure 2:
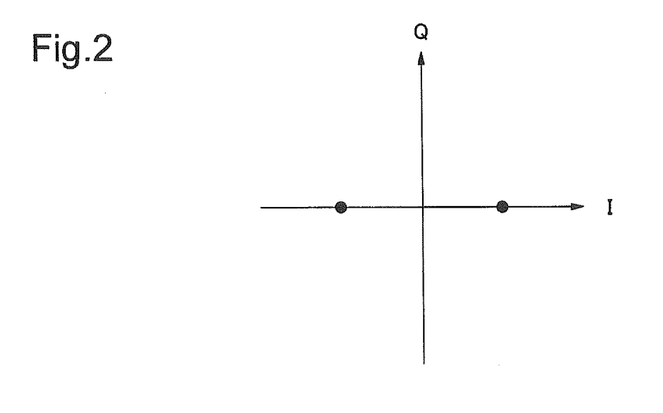
FIG. 2 shows a constellation just after the modulation of X-I signal.
Figure 3:
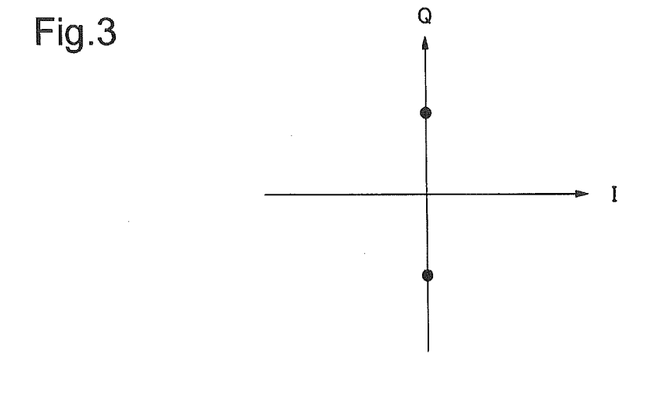
FIG. 3 shows a constellation just after the modulation of X-Q signal.
Figure 4:
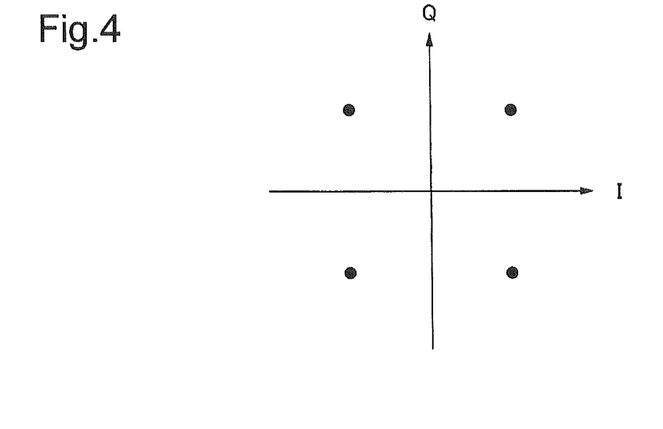
FIG. 4 shows a constellation of the mixed signal of X-I signal and X-Q signal.

FIG. 2 indicates the constellation just after the modulation of the X-I signal modulated with PSK modulation on the I axis (Point A of FIG. 1). FIG. 3 indicates the constellation just after the modulation of the X-Q signal modulated with PSK modulation on the Q-axis (Point B of FIG. 1). The X-Q signal has the phase rotation of $\pi/2$ to the X-I signal by the phase shifter 53. The signals with the constellation shown in FIG. 2 and FIG. 3 have the phase rotation of $\pi/4$ and are merged at the point C respectively. FIG. 4 indicates the constellation of the signal to which the X-I signal and X-Q signal are merged (Point C of FIG. 1). As a result, the modulation signal of the X polarization light in the point C has the constellation as shown in FIG. 4.

Figure 5:
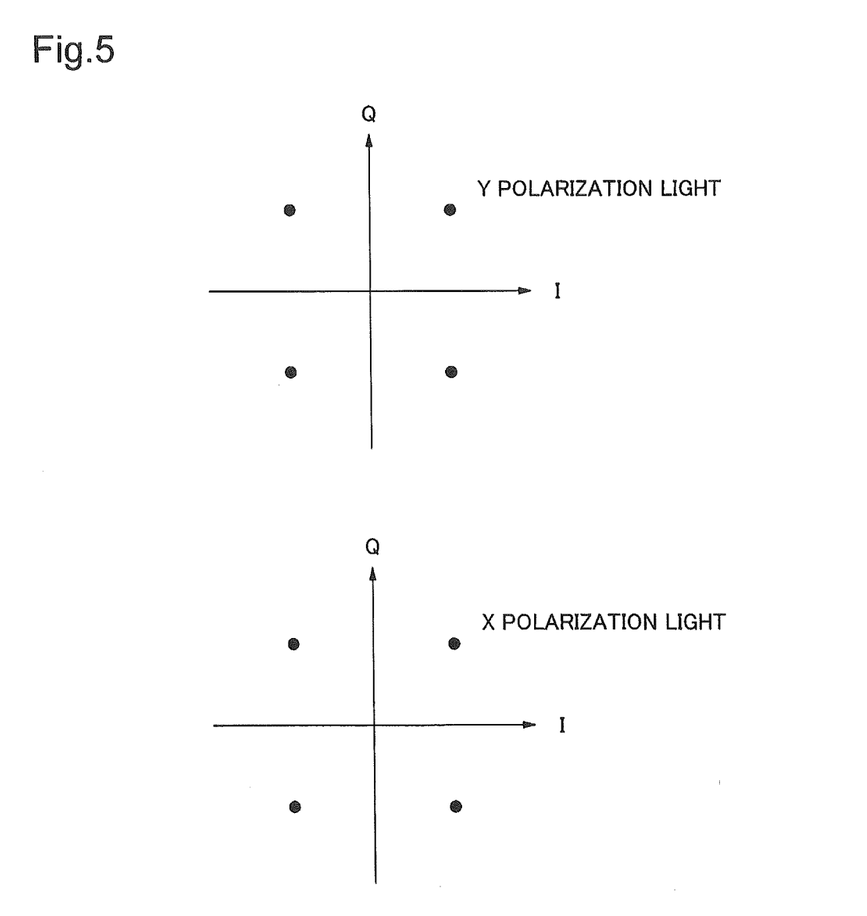
FIG. 5 shows a constellation of the polarization-combined light with PBC.

The constellations shown in FIGS. 2 to 4 are similar to that of the Y polarization light in FIG. 1. As a result, the constellation of the light for which the polarization-combination has been performed with the PBC 52 becomes to be as shown in FIG. 5.

Supposing the bit rate of the PSK modulation indicated by the constellations of FIG. 2 and FIG. 3 are 25 Gbps respectively, the bit rate of the QPSK signal indicated by the constellation of FIG. 4 is 50 Gbps, and the optical transmitter 1 realizes the bit rates of 100 Gbps for the polarization-combination of the X polarization light and the Y polarization light.

Incidentally, because the basic configuration and the operation of the DP-QPSK modulator are known well, the more detailed description is omitted. Further, the first exemplary embodiment has described the DP-QPSK modulator 5, in which the whole is configured by an optical waveguide. However, the DP-QPSK modulator 5 may be configured by connecting a plurality of optical parts with an optical fiber so that the similar function may be realized.

By arranging the polarizer 4 in an input part of the DP-QPSK modulator 5, the optical transmitter 1 of the first exemplary embodiment described above can suppress the degradation of the polarization extinction ratio of the RZ pulse inputted to the DP-QPSK modulator 5. As a result, the optical transmitter 1 can output the DP-QPSK signal using RZ code with high extinction ratio. That is, in an optical transmission system using an RZ code, the optical transmitter 1 of the first exemplary embodiment offers the effect that improves the quality of the transmission signal.

As the modification of the first exemplary embodiment, an RZ optical modulator which has only an RZ carver, a polarization regulator, and an optical modulator can be considered.

In the RZ optical modulator having such configuration, the RZ carver generates an RZ pulse train. The polarization regulator outputs the light outputted from the RZ carver as linear polarization. Further, the optical modulator modulates and outputs the RZ pulse train outputted from the polarization regulator. Incidentally, in the modification of the first exemplary embodiment, the optical modulator is not limited to a DP-QPSK modulator. Further, as the polarization regulator, a polarizer may be used.

In the RZ optical modulator of the modification of such first exemplary embodiment, an RZ pulse train with the high extinction ratio is inputted to the optical modulator by using a polarization regulator. As a result, the optical modulator can output a modulation signal with high extinction ratio. Accordingly, in the optical transmission system using an RZ code, the RZ optical modulator of the modification of the first exemplary embodiment also offers the effect that the quality of the transmission signal is improved.

The Second Exemplary Embodiment

Figure 6:
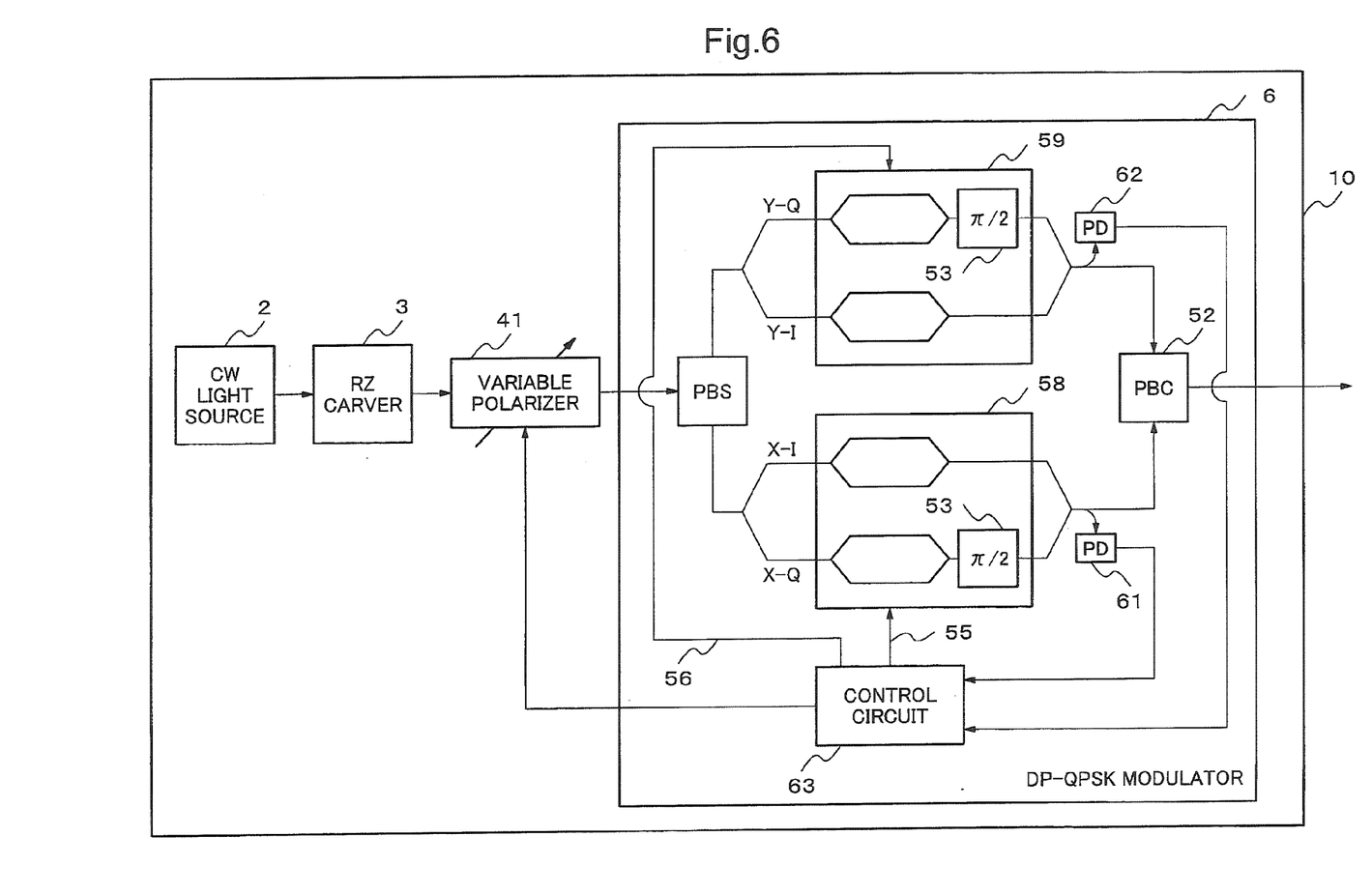
FIG. 6 shows a composition of the optical modulator of the second exemplary embodiment.

FIG. 6 is a figure which shows the configuration of the optical modulator of the second exemplary embodiment of the present invention. The optical transmitter 10 shown in FIG. 6 has a variable polarizer 41 instead of the polarizer 4 in comparison with the optical transmitter 1 shown in FIG. 1. And the CW light source 2, the RZ carver 3, the variable polarizer 41 and DP-QPSK modulator 6 are connected each other with polarization maintaining fibers.

By a control signal from outside, the variable polarizer 41 rotates the polarization plane of the linearly polarized light outputted from the variable polarizer 41. For example, a ½ wavelength plate can be employed as the variable polarizer 41. The polarization plane of the linearly polarized light can be rotated by rotating the ½ wavelength plate which makes a linearly polarized light pass through by a control signal. Otherwise, the variable polarizer 41 may have the configuration in which the linearly polarized light in turn passes through two pieces of the ¼ wavelength plates connected in series. In the configuration using the ¼ wavelength plate, the ¼ wavelength plate in an input side converts a linearly polarized light into a circular polarization light and the ¼ plate in an output side outputs the circular polarization light as a linearly polarized light. And the polarization plane of the linearly polarized light outputted from the ¼ wavelength plate in the output side can be rotated by rotating the ¼ wavelength plate in the output side by a control signal. Because the functions of the CW light source 2 and the RZ carver 3 are similar to the first embodiment figure, the description will be omitted.

The optical transmitter 10 is equipped with a PD (photo diode) 61 and a PD 62 for monitoring inside the DP-QPSK modulator 6. The PDs 61 and 62 for monitoring receive the lights respectively which are the branching part of the X polarization light and the Y polarization light after the modulation, and output monitor currents proportional to the strength of the received lights.

Generally, in a QPSK modulator, the phase difference of an I signal and a Q signal needs to be maintained in $\pi/2$. For this reason, the ABC (automatic bias control) control which monitors the light after the modulation and feed-backs the result of the monitoring to the bias voltage applied to the electrode part of the optical modulator is performed. By the ABC control, a phase difference of modulated I signal and Q signal are maintained in $\pi/2$. Because the ABC control of a QPSK modulator is well known and the ABC control does not relate directly with the configuration of the present invention, the detailed description will be omitted. The operation of the components of the DP-QPSK modulator 6 other than PDs 61, 62 and the control circuit 63 are similar to the DP-QPSK modulator 5 of the first exemplary embodiment.

An optical transmitter 10 improves the polarization extinction ratio of an RZ pulse train by arranging the variable polarizer 41 between the RZ carver 3 and the DP-QPSK modulator 6. As a result, the optical transmitter 10 can output the DP-QPSK signal using an RZ code of high extinction ratio like the optical transmitter of the first exemplary embodiment.

Here, when the polarization extinction ratio of the light inputted to the DP-QPSK modulator is low, the SNR of the output currents of the PDs 61 and 62 for monitoring which monitor the light intensity degrades and it may not be possible to perform the high precision ABC control to the respective QPSK modulators of both of the X and Y polarizations. However, because the SNR deterioration of the monitor current by the degradation of polarization extinction ratio can be suppressed by having the variable polarizer 41, the optical transmitter 10 also has the effect that the precision of the ABC control can be increased.

Moreover, the variable polarizer 41 can rotate the polarization plane of the output of the RZ carver based on the monitor current outputted by the PD 61 and 62 for monitoring. And the optical transmitter 10 can vary the strength of the X polarization light and the Y polarization light branched in the PBS 51 by rotating the polarization plane of the light which the variable polarizer 41 outputs.

As stated in the first exemplary embodiment, when the polarization loss difference (polarization dependent loss) occurs in the strength of the X polarization light and the strength of the Y polarization light, the difference may occur in the transmission quality between the signal of the X polarization light and the signal of the Y polarization light to which the polarization-combination has been performed. Accordingly, by rotating the polarization plane of a variable polarizer 41 so that the monitor current of the PD 61 for monitoring and the monitor current of the PD 62 for monitoring may be equal, the strength of the X polarization light and the strength of the Y polarization light after the modulation can be controlled so as to become equal. Even when the internal loss of the DP-QPSK modulator varies by a fluctuation of the environmental condition or the like, as a result, the optical transmitter 10 can be controlled so that the strength of the X polarization light and the strength of the Y polarization light which are inputted to the PBC 52 may be accorded.

Thus, in an optical transmission system using an RZ code, the optical transmitter 10 of the second exemplary embodiment also offers the effect that the quality of the transmission signal is improved.

The Third Exemplary Embodiment

Figure 7:
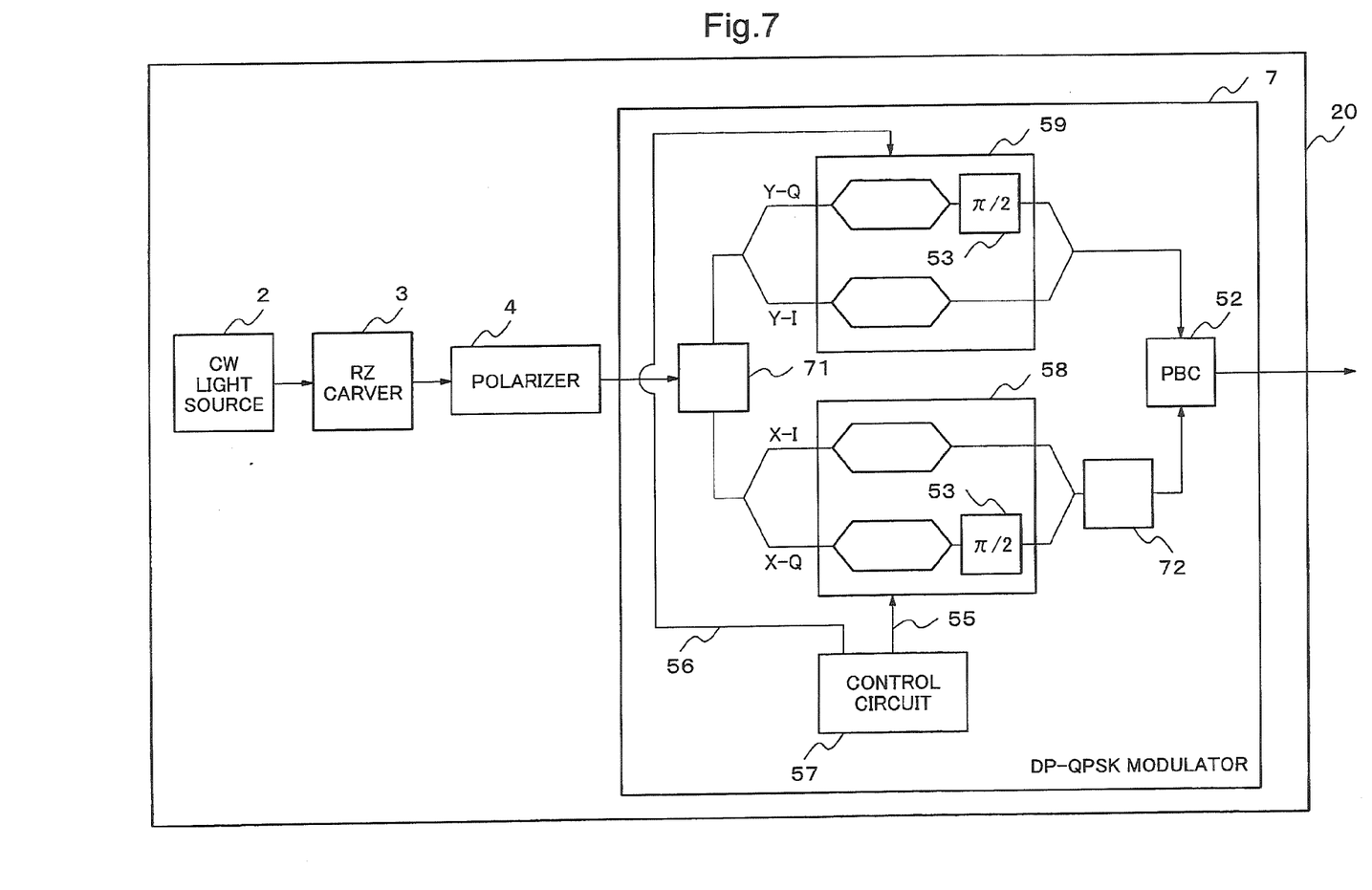
FIG. 7 shows a composition of the optical modulator of the third exemplary embodiment.

FIG. 7 is a figure which shows a configuration of an optical transmitter 20 of the third exemplary embodiment of the present invention. The optical transmitter 20 shown in FIG. 7 includes a CW light source 2, an RZ carver 3, a polarizer 4 and a DP-QPSK modulator 7. The CW light source 2, the RZ carver 3, the polarizer 4 and the DP-QPSK modulator 7 are connected each other by polarization maintaining fibers.

Because the configuration and the operation of the CW light source 2, the RZ carver 3 and the polarizer 4 in the optical transmitter 20 are similar to the optical transmitter 1 of the first exemplary embodiment, the respective descriptions will be omitted.

The DP-QPSK modulator 7 has the different point that a Y branch 71 and a polarization rotating appliance 72 are included compared with the DP-QPSK modulator 5 of the first exemplary embodiment. The Y branch 71 branches an inputted RZ pulse train in two optical paths simply. The DP-QPSK modulator 7 branches the light in Y branch 71 and rotates the polarization of the X polarization light by $\pi/2$ so as to be orthogonal to the polarization of the Y polarization light by using the polarization rotating appliance 72 just before performing the polarization-combination in the PBC 52. Here, as the polarization rotating appliance 72, for example, an ½ wavelength plate may be inserted on the optical path of the X polarization light with the angle rotating the X polarization light by $\pi/2$. And the PBC 52 performs the polarization-combination of the X polarization light and the Y polarization light, and generates the DP-QPSK modulation signal. In the DP-QPSK modulator 7, the operation of the components other than the Y branch 71 and the polarization rotating appliance 72 is similar to the DP-QPSK modulator 5 of the first exemplary embodiment.

The RZ pulse with high extinction ratio is inputted by the polarizer 4 to the DP-QPSK modulator 7 in the optical transmitter 20 equipped with the DP-QPSK modulator 7 with such configuration. The DP-QPSK modulator 7 performs the QPSK modulation to the signals branched into two respectively using RZ pulses with high polarization extinction ratio. And the DP-QPSK modulator 7 rotates the polarization of the X polarization light modulated with QPSK and multiplexes the X polarization light with the Y polarization light in the PBC 52. As a result, the optical transmitter 20 can output the DP-QPSK signal using the RZ code with high extinction ratio.

Thus, in an optical transmission system using an RZ code, the optical transmitter 20 of the third exemplary embodiment also offers the effect that the quality of the transmission signal is improved.

Incidentally, in the third exemplary embodiment, the configuration of the DP-QPSK modulator 7 is not limited to an optical waveguide. The DP-QPSK modulator 7 may be configured with connecting a plurality of the optical parts by optical fibers so that the similar function may be realized. The realization means of the polarization rotating appliance 72 is not limited to the ½ wavelength plates, and a polarization rotating appliance using an optical waveguide, for example, may be used.

In the DP-QPSK modulator 7, the polarization plane rotates by $\pi/2$ before and behind the polarization rotating appliance 72. Since the characteristic of the optical waveguide changes greatly depending on a polarization, the predetermined performance of the optical modulator may not be obtained when the polarization plane of the light signal is rotated by the polarization rotating appliance 72 on the way of the optical waveguide. For this reason, for example, the electrode parts 58 and 59 and the Y branch 71 are made with an optical waveguide and the polarization rotating appliance 72 and the PBC 52 may be used as an discrete parts. And the DP-QPSK modulator 7 may be configured by connecting the polarization rotating appliance 72, the PBC 52 and the electrode parts 58 and 59 by polarization maintaining fibers.

Although it has been supposed that the modulation scheme of the optical modulator is QPSK in the first to the third exemplary embodiments, the modulation method is not limited to QPSK. For example, the modulation method may be the QAM (quadrature amplitude modulation).

In this way, the exemplary embodiments of the present invention have been described with reference to the first to the third exemplary embodiments. However, the form in which the present invention is applicable is not limited to the exemplary embodiments mentioned above. Various changes which a person skilled in the art can understand in the scope of the present invention can be applied to the configuration and the detail description of the present invention.

This application is based upon and claims the benefit of priority from Japanese Patent Application No. 2011-147562 applied on Jul. 1, 2011, the disclosure of which is incorporated herein in its entirety by reference.

REFERENCE SIGNS LIST 1, 10 and 20 Optical transmitter
2 CW light source
3 RZ carver
4 Polarizer
5, 6 and 7 DP-QPSK modulator 41 Variable polarizer
51 PBS
52 PBC
53 Phase shifter
55, 56 Data
58, 59 Electrode part
61, 62 PD
57, 63 Control circuit
71 Y branch
72 Phase rotator

The invention claimed is:

1. An RZ (return to zero) optical modulator, comprising:
an RZ carver that outputs an optical pulse train of an RZ code;
a polarization adjustment unit that improves a polarization extinction ratio of the optical pulse train outputted from the RZ carver and outputs the optical pulse train whose extinction ratio is improved;
an optical modulation unit that modulates the optical pulse train outputted from the polarization adjustment unit and outputs the modulated optical pulse train, wherein the optical modulation unit polarization-multiplexes the modulated optical pulse train and outputs a polarization-multiplexed optical signal;
a monitor unit that outputs a light intensity of each of polarizations of the modulated optical pulse train; and
a control unit that controls a polarization angle of the optical pulse train to the optical modulator outputted from the polarization adjustment unit based on an output of the monitor unit.

2. The RZ optical modulator according to claim 1, wherein the optical modulation unit comprises a QPSK (differential quadrature phase shift keying) modulator or a QAM (quadrature amplitude modulation) modulator.

3. The RZ optical modulator according to claim 1, wherein the polarization adjustment unit comprises a polarizer.

4. The RZ optical modulator according to claim 1, wherein the optical modulation unit comprises a QAM (quadrature amplitude modulation) modulator.

5. The RZ optical modulator according to claim 1, wherein the optical modulation unit comprises an optical waveguide device comprising a plurality of modulators connected in parallel.

6. The RZ optical modulator according to claim 1, wherein the optical modulation unit comprises a separator that is configured to separate an input light to two lights whose polarizations are orthogonal to each other.

7. The RZ optical modulator according to claim 6, wherein the separated two lights are modulated by data outputted from the control unit.

8. The RZ optical modulator according to claim 6, wherein the optical modulation unit adjusts an intensity difference between the separated two lights by setting a polarization direction of light outputted from the polarizer such that each of the separated two lights which are outputted from the separator has a same strength.

9. The RZ optical modulator according to claim 1, wherein the optical modulation unit comprises:
a Y branch that branches the optical pulse train outputted from the polarization adjustment unit in two optical paths; and
a polarization rotating appliance that rotates a polarization of polarization light in one of the two optical paths to be orthogonal to a polarization of polarization light in another one of the two optical paths before performing a polarization-combination.

10. An RZ (return to zero) optical modulation method, comprising:
outputting an optical pulse train of an RZ code;
improving a polarization extinction ratio of the optical pulse train and outputting the optical pulse train whose extinction ratio is improved;
modulating the optical pulse train whose polarization extinction ratio is improved and outputting the modulated optical pulse train, wherein the modulating comprises polarization-multiplexing the modulated optical pulse train and outputting a polarization-multiplexed optical signal;
outputting, by a monitor, a light intensity of each of polarizations of the modulated optical pulse train; and
controlling a polarization angle of the optical pulse train to an optical modulator outputted the optical pulse train whose extinction ratio is improved based on an output of the monitor.

11. The RZ optical modulation method according to claim 10, wherein a polarizer improves the polarization extinction ratio.

12. An RZ (return to zero) optical modulator, comprising:
an RZ carver for outputting an optical pulse train of an RZ code;
polarization adjustment means for improving and outputting a polarization extinction ratio of the optical pulse train outputted from the RZ carver;
optical modulation means for modulating and outputting the optical pulse train outputted from the polarization adjustment means, wherein the optical modulation means polarization-multiplexes the modulated optical pulse train and outputs a polarization-multiplexed optical signal;
monitoring means that outputs a light intensity of each of polarizations of the modulated optical pulse train; and
control means that controls a polarization angle of the optical pulse train to the optical modulator outputted from the polarization adjustment means based on an output of the monitoring means.

13. The RZ optical modulator according to claim 12, wherein the optical modulation means comprises a QAM (quadrature amplitude modulation) modulator.

14. The RZ optical modulator according to claim 12, wherein the optical modulation means comprises an optical waveguide device comprising a plurality of modulators connected in parallel.

15. The RZ optical modulator according to claim 12, wherein the optical modulation means comprises a separator that is configured to separate an input light in two lights whose polarizations are orthogonal to each other.

16. The RZ optical modulator according to claim 15, wherein the separated two lights are modulated by data outputted from the control means.

17. The RZ optical modulator according to claim 15, wherein the optical modulation means adjusts an intensity difference between the separated two lights by setting a polarization direction of light outputted from the polarizer such that each of the separated two lights which are outputted from the separator has a same strength.

18. The RZ optical modulator according to claim 12, wherein the optical modulation means comprises:
a Y branch that branches the optical pulse train outputted from the polarization adjustment means in two optical paths; and
a polarization rotating appliance that rotates a polarization of polarization light in one of the two optical paths to be orthogonal to a polarization of polarization light in another one of the two optical paths before performing a polarization-combination.

\* \* \* \* \*